United States Patent Office 3,446,575
Patented May 27, 1969

3,446,575
PREPARATION OF HETEROPOLYMOLYBDIC ACIDS
Vincent Chiola, Towanda, and Jerome G. Lawrence, Nanticoke, Pa., assignors to Sylvania Electric Products Inc., a corporation of Delaware
No Drawing. Filed Dec. 28, 1966, Ser. No. 605,177
Int. Cl. C22b 59/00
U.S. Cl. 23—22                    16 Claims

ABSTRACT OF THE DISCLOSURE

A process for producing heteropolymolybdic acids is disclosed wherein a concentrated aqueous reaction mixture of a water soluble molybdate and a heteroatom source is formed wherein there is at least 0.5 gram atom of the heteroatom for each 12 gram atoms of molybdenum in the reaction mixture and the reaction mixture is maintained at a temperature of from about 20° C. to about 100° C. for a period of time to solubilize the components and to initiate the reaction and to thereafter bring the reaction mass into contact with a cation exchange material on the hydrogen cycle and recovering the heteropolymolybdic acid that is formed.

---

This invention relates broadly to the preparation of heteropolymolybdic acid, e.g., molybdophosphoric, molybdosilicic and molybdovanadic acids. These acids also may be designated, respectively, as phosphomolybdic, silicomolybdic and vanadomolybdic acids..

The foreign anion or atom (i.e., heteroatom) in the heteropolymolybdic acid produced by the method of this invention is not limited to P, Si, or V as in the aforementioned illustrative examples. It may be any heteroatom of an elemental metal (including metalloid) which, in the form of a water-soluble compound thereof, e.g., an alkali-metal (specifically sodium or potassium) salt, or in the form of a substance that is convertible in situ at the reaction temperature to a water-soluble compound of the elemental metal, or a plurality of such compounds or substances, can condense with a water-soluble molybdate, more particularly an alkali-metal molybdate such as sodium or potassium molybdate, to form a heteropolymolybdate. By "water-soluble" it is meant that the preformed or in situ formed compound has at least some solubility in water at the reaction temperature.

The present invention is directed particularly to an improvement in the method of converting the aforementioned heteropolymolybdate to the heteropolymolybdic acid.

Heteropoly acids are known. They have been prepared by heating a normal salt of the acid that supplies the central atom with an anhydride of the coordinated acid. For example, molybdovanadophosphates can be prepared by warming molybdophosphates with vanadates or with $V_2O_5$; or by adding phosphoric acid to a mixture of alkali vanadate and molybdate solutions. Other methods have involved extracting with ethyl ether an aqueous solution containing the sodium salt of the heteropoly acid of tungsten or molybdenum. The pure heteropoly acid is then crystallized from the ether solution.

Bechtold (U.S. Patent No. 2,503,991) discloses a process wherein an aqueous solution containing a mixture of an alkali-metal phosphate with either an alkali-metal molybdate or tungstate, or containing a mixture of an alkali-metal silicate with an alkali-metal molybdate, is contacted with an organic or inorganic cation-exchange substance, which may be a cation-exchange resin. In this process there is first prepared a dilute aqueous solution of a mixture of an alkali-metal silicate with an alkali-metal molybdate that contains not more than 10% by weight of total solids calculated as mixed oxides, and this dilute aqueous solution is brought into contact with the cation-exchange reagent. In another embodiment, a mixture of an alkali-metal phosphate with an alkali-metal molybdate or tungstate containing not more than 10% by weight of total solids, calculated as the mixed oxides, is brought into contact with the cation-exchange reagent. The patentee states that "Best results are obtained with solutions containing from 1 to 6% by weight of total solids, calculated as the mixed oxides."

An improvement upon one embodiment of the invention described in the aforementioned Bechtold patent is disclosed in application Ser. No. 233,930 of John M. Laferty, Jr., filed Oct. 29, 1962, now Patent No. 3,288,562, dated Nov. 29, 1966, and assigned to the same assignee as the present invention. It is there disclosed that in the preparation of phosphotungstic acid, in accordance with one embodiment of the invention, a solution of sodium phosphotungstate containing 30% or more solute can be used in the cation-exchange step, and that "solutions of from about 20% to about 30% concentration have been found particularly suitable." The solution of sodium phosphotungstate is prepared in a particular manner which involves first adding tungstic acid, $H_2WO_4$, to a solution of sodium tungstate in water. The tungstic acid reacts with the sodium tungstate to form sodium metatungstate in solution. After removing the insoluble material (excess undissolved tungstic acid) by filtration, sufficient phosphoric acid is added to the filtrate to convert the sodium metatungstate to sodium phosphotungstate. The solution of sodium phosphotungstate is then brought into contact with a suitable cation-exchange material to replace the sodium ion in the dissolved salt with hydrogen ion.

In the copending application of Vincent Chiola and Clarence D. Vanderpool, Ser. No. 435,070, filed Feb. 24, 1965, now U.S. Patent 3,361,518, and assigned to the same assignee as the present invention, there is disclosed and claimed a method of preparing heteropolytungstic acids wherein the disadvantages inherent in the introduction of added mineral acid to the reaction mass are obviated or minimized.

The present invention is based upon our discovery that alkali-metal salt solutions containing molybdenum and a heteroatom, e.g., a solution of sodium molybdate and disodium phosphate, can be processed differently than one can process similar alkali-metal salt solutions containing tungsten and a heteroatom, e.g., a solution of sodium tungstate and disodium phosphate. In using the cation-exchange technique to process alkali (e.g., sodium) salt molybdate-heteroatom solutions to alkali-free heteropolymolybdic acid solutions, we have surprisingly and unobviously found that this can be accomplished in one stage, and while using up to 50 times the molar concentration of sodium molybdate previously considered possible as evidenced by the teachings in the prior art. The resultant concentrated solution of substantially alkali-free heteropolymolybdic acid has obvious advantages for direct use as a solution, as well as in further processing to yield heteropolymolybdic acid.

It has been indicated in the previous discussion of the prior art that, in using a cation-exchange material for preparing heteropoly acids of heavy metals such as tungsten and molybdenum, it has been the practice to use only dilute solutions of sodium tungstate or sodium molybdate in order, simultaneously, to acidify, remove alkali, and form the heteropoly acid. By "dilute" solutions are meant solutions containing up to 0.1 mole of $Na_2WO_4 \cdot 2H_2O$ (i.e., up to 33 g. per kg. of solution) or up to 0.1 mole of $Na_2MoO_4 \cdot 2H_2O$ (i.e., 24.2 g. per kg. of solution). In other words, it has been the prior-art practice to use solutions containing from 1 to 10% by weight of total solids calculated as the mixed oxides.

Contrary to the teachings of the prior art, we have found that concentrated solutions of the reactants broadly and specifically described in the second paragraph of this specification for use in the formation of a heteropolymolybdate can be further processed at high concentrations in contact with a cation-exchange material, preferably a cation-exchange resin, on the hydrogen cycle, without need to reduce the pH of the solution and without incurring the disadvantage of precipitation of insoluable oxides on the cation-exchange substance. By "high concentrations," it is meant that the solution contains at least 25% (e.g., 25, 30, 40 or even as much as about 50%) by weight thereof, calculated as the mixed oxides, of the water-soluble heteropolymolybdenum compound, more particularly alkali-metal (specifically sodium or potassium) heteropolymolybdate. Taking sodium molybdate, $Na_2MoO_4 \cdot 2H_2O$, as illustrative of the water-soluble molybdenum compound, the contacting of a solution thereof with a cation-exchange material of the preferred kind, on the $H^+$ cycle, can be effected at solution concentrations of the sodium molybdate corresponding to from about 2.5 to about 5 moles thereof per kg. of the solution.

From the foregoing, it will be seen that the method of this invention is much simpler and is in marked contrast to the procedure required in making highly concentrated solutions of sodium phosphotungstates. In the latter case (see the aforementiond Laferty, Jr. patent), acidification with a mineral acid such as HCl is necessary to convert sodium tungstate to sodium metatungstate before reacting the latter with phosphoric acid to form sodium phosphotungstate, which is then (as a solution containing about 20–30 weight percent of solute) brought into contact with a cation-exchange material on the hydrogen cycle.

The present invention is applicable only to the preparation of heteropolymolybdic acid solutions (from which the said acid is thereafter preferably isolated) and not to the preparation of heteropolytungstic acid solutions. Attempts to prepare heteropolytungstate solutions under the same conditions result in excessive precipitation of oxides on the cation-exchange material, decreased flow of the solution through a bed of the cation-exchange substance, and generally decreased efficiency in the conversion of the heteropolytungstate to the heteropolytungstic acid.

The general procedure for carrying out the method of this invention is essentially as follows:

An admixture is prepared, in an aqueous medium, of (A) a water-soluble molybdate, e.g., sodium, potassium, or other alkali-metal molybdate (preferably sodium molybdate) and (B) a water-soluble compound (e.g., a water-soluble salt) of the elemental metal (including metalloid) that provides the heteroatom, or a substance which is convertible, e.g., by hydrolysis, at the reaction temperature to a water-soluble compound of the aforesaid elemental metal, e.g., alkyl and alkoxy derivatives of the said elemental metal such as isopropyl aluminate and tetraethyl orthosilicate. Mixtures of the substances of (B) can be used, if desired, thereby to produce compounds containing multi-heteroatoms.

Illustrative examples of the heteroatoms present in the compound or substance of (B), supra, are, for instance, aluminum, antimony, boron, cerium, cobalt, germanium, iron, nickel, niobium, phosphorus, silicon, tin, titanium and vanadium.

The amount of water used in forming the mixture or solution of starting reactants is generally such that the aqueous liquid reaction mass which thereby is formed contains at least 25%, and may be as much as about 50% or more, by weight of solids (total solids) exclusive of any combined water of crystallization in the starting reactants. If the component of (B) is a hydrolyzable substance, the amount of water should obviously be at least the stoichiometrical amount, and preferably substantially in excess of the stoichiometrical amount, required for complete hydrolysis of the said hydrolyzable substance.

The amount of the substance of (B), which is the source of the heteroatom, in the aforementioned aqueous medium is sufficient to provide at least 0.5 gram atom, more particularly from 0.5 (or from about 1.0) to about 1.5–2 gram atoms of the heteroatom for each 12 gram atoms of molybdenum in the water-soluble molybdate of (A).

The temperature of admixing and/or solubilization or reaction of the components of (A) and (B) in the aqueous medium thereby to form an aqueous liquid reaction mass is within the range of from about 20° C. to about 100° C. depending, mostly, upon the particular starting components and relative proportions thereof that are employed as well as their concentration in the aqueous medium. When the preferred, readily-soluble components such as those in the form of sodium salts are employed, ambient temperature (20°–30° C.) is usually satisfactory. In other cases, slight warming or heating to 35°–55° C. or even higher temperatures of the order of 60°–70° C. to 90° C. may be desirable or necessary.

In general, the aqueous liquid reaction mass is maintained within the aforementioned temperature range for a period of time sufficient to solubulize (wholly or partly) the components of (A) and (B) and to at least initiate reaction therebetween. At the end of the period required to obtain, with agitation if necessary, a homogeneous admixture or solution, and which may range from two or three minutes to 6–8 hours or more, any insoluble material therein is removed by suitable means, e.g., by settling, decanting, filtration, centrifuging or the like.

The filtrate is then contacted with a cation-exchange material on the hydrogen ($H^+$) cycle. Various, available cation-exchange substances may be used for this purpose, and they may be organic or inoragnic, and of natural or synthetic orgin. Among such materials may me mentioned gel zeolites, petroleum sludges, processed clays, the various phenol-aldehyde resins containing sulfonic groups, and the various sulfonated, moderately cross-linked sulfonated polymers, the primary component of which forms a thermoplastic polymer when polymerized alone. We have found that a particularly effective (and, therefore, preferred) material for use in the method of this invention is a sulfonated copolymer of styrene and divinylbenzene (cross-linking component) wherein the latter constitutes from about 6 to about 10 mole percent, and specifically about 8 mole percent, of the copolymer, and has a void volume of from 30 to 50%, specifically about 40%.

Typical properties of the aforementioned preferred copolymer, which is a commercially available product (Illco 211 of Illinois Water Treatment Company, Rockford, Ill.) are as follows:

Wet mesh size _____ 16–50 mesh (U.S. Standard Sieve Series).
Maximum operating temperature _____ 750 ° F.
Density _____ 50–52 lbs./cu. ft.
Cross-linkage _____ 8% from divinyl benzene monomer.
Specific gravity _____ 1.27.
Moisture content _____ 45–50%.
Void volume _____ 40%.
Active group _____ —$SO_3H$.
Maximum swelling _____ 7%.
Total exchange capacity ____ 1.8 meq./ml. based on $H^+$ form; on same basis, 4.5 meq./dry g.

The influent solution contains at least 25% total solids, e.g., 25 to 40 or even about 50% total solids, calculated as the mixed oxides (i.e., on a net-dry basis, viz. without the water of crystallization). A typical flow rate through the bed or column of cation-exchange material, expecially when the preferred above-described resin is being used for this purpose, is from about 0.3 to about 0.7, specifically about 0.5, gallon/cubic foot/minute. The effluent from the column is a clear, stable solution.

As indicated hereinbefore and specifically shown in the illustrative examples that follow, the contact with the above-described solution and the cation-exchange material is preferably accomplished by passing the solution through a bed of the material whereby the sodium (or other alkali-metal, or other salt-forming cation component of the water-soluble salt) is replaced in the dissolved salt with hydrogen ion. However, the contact can also be accomplished by dispersing the cation-exchange material in the heteropolymolybdate solution contained in a vessel, that is, by so-called "contact-filtration" technique. After allowing sufficient time for the material to exchange the sodium or other cations present, the resulting solution of the heteropolymolybdic acid is recovered by filtration. The desired heteropolymolybdic acid is then readily recovered from the solution, if desired, by concentration and filtration.

In order that those skilled in the art may better understand how the present invention can be carried into effect, the following examples are given by way of illustration and not by way of limitation. All parts and percentages are by weight unless otherwise stated. In carrying out the method described in these examples, a bed of cation-exchange resin (Illco 211) having a volume of 0.126 cubic feet was first regenerated; that is, it was converted from the Na+ cycle, as originally supplied by the resin manufacturer, to the H+ cycle using 24 liters 12% HCl solution to effect this result. The alkali salt solution containing sodium molybdate and, typically, a sodium salt of the acid containing the heteroatom, at a total concentration of from about 28% to about 36% by weight of total solids (calculated as the mixed oxides) in the solution, was passed through the column of resin at a rate of about 0.5 gallon/cubic foot/minute.

Example 1.—Preparation of silicomolybdic acid

A solution of sodium molybdate was prepared by dissolving 576 grams $MoO_3$ in a sodium hydroxide solution containing the stoichiometrical amount of NaOH for converting the oxide to sodium molybdate, $Na_2MoO_4$, in aqueous solution. The sodium hydroxide solution was made by dissolving 320 grams NaOH in 2.2 liters of water. A sodium silicate solution was prepared by dissolving 64 grams of silica gel, $SiO_2$, in a caustic solution containing 80 grams NaOH in 200 ml. water. The silicon content was 200% in excess over the stoichiometrical quantity required to give a Mo:Si ratio of 12:1.

After mixing the molybdate and silicate solutions, the resulting solution was filtered to remove insoluble matter, including some insoluble silica. The pH of the solution was 9.6, and the specific gravity was 1.25. This solution, which contained about 28% total solids calculated as the mixed oxides, was then passed through a cation-exchange resin bed on the H+ cycle in order to remove Na+. The green-colored effluent solution had a pH of 1.0 and contained less than 0.01% sodium. Silicomolybdic acid of high purity was crystallized upon evaporation of the solution. The yield of product was in excess of 98% of the theoretical yield. The product was identified as silicomolybdic acid, $H_4(SiMo_{12}O_{40}) \cdot xH_2O$, by X-ray diffraction examinations; and, also by elemental analysis as indicated by the following data:

| | Found | Theoretical for $H_4(SiMo_{12}O_{40}) \cdot 5H_2O$ |
|---|---|---|
| Percent $MoO_3$ | 89.23 | 89.44 |
| Percent $SiO_2$ | 3.06 | 3.11 |

Example 2.—Preparation of vanadomolybdic acid

Five hundred (500) grams of $Na_2MoO_4 \cdot 2H_2O$ (about 2.06 moles) was dissolved in 840 ml. of deionized water at room temperature. To this solution was added 37.5 grams sodium vanadate, $Na_3VO_4 \cdot xH_2O$, as a solution in 50 ml. of deionized water. The mixture was passed through a bed of cation-exchange resin (Illco 211) having the aforementioned properties while said resin was on the hydrogen cycle. The effluent solution, containing about 36% total solids calculated as the mixed oxides, was strongly acidic (pH=1.0), and contained less than 0.2% sodium. The theoretical sodium content of sodium vanadomolybdate, $Na_3VMo_{12}O_{40} \cdot xH_2O$, is 3.4%. The low sodium content vanadomolybdic acid was crystallized from solution by evaporation.

Example 3.—Preparation of phosphomolybdic acid

A total of 382 grams of $MoO_3$ was dissolved in a solution containing 212 grams NaOH pellets in 1.2 liters of water. To the resulting solution was added 22.2 grams of 85% phosphoric acid, yielding a solution having a pH of 7.5 and a specific gravity of 1.225. It contained about 32% total solids calculated as the mixed oxides. This alkali molybdate-phosphate solution was passed through a column of cation-exchange resin (Illco 211) to give a dark green-colored solution having a pH of 1.0. The effluent solution of phosphomolybdic acid was then evaporated on a steam bath to yield crystalline phosphomolybdic acid, which was identified by X-ray diffraction examination and by chemical analysis. The product was also characterized by thermogravimetric analysis as $H_3[PMo_{12}O_{40}] \cdot 31H_2O$.

In all of the foregoing examples, admixing (dissolution) and passage through the resin bed were carried out at ambient temeprature (20°–30° C.).

The heteropolymolybdic acids that are produced by the method of this invention are useful as catalysts or as a component of catalysts (e.g., hydration and dehydration catalysts) employed in chemical and related processes. The relatively low content of sodium ion in the heteropolymolybdic acids resulting from the method is, therefore, of particular significance since it is known that, in many cases, the sodium ion poisons the catalytic activity of catalysts of this type.

What is claimed is:

1. The method of preparing a heteropolymolybdic acid which consists essentially in the following steps:
   (I) preparing an admixture in water of (A) a water-soluble molybdate and (B) a source of a heteroatom of an elemental metal or metalloid selected from the group consisting of (a) water-soluble compounds of a heteroatom and (b) substances that are convertible in situ to a water-soluble compound of a heteroatom, the proportions of the reactants of (A) and (B) in said water being such that the aqueous liquid reaction mass which thereby is formed contains at least 25% by weight of the reactants (A) and (B) exclusive of any combined water of crystallization in the starting reactants, and the amount of the substance of (B) in the aqueous liquid reaction mass being sufficient to provide at least 0.5 gram atom of the heteroatom for each 12 gram atoms of molybdenum in the water-soluble molybdate of (A);
   (II) maintaining the aqueous liquid reaction mass defined in step (I) at a temperature within the range of from about 20° C. to about 100° C. for a period of time sufficient to solubilize the components of (A) and (B) and to at least initiate reaction therebetween;
   (III) bringing said liquid reaction mass, after first removing therefrom any insoluble material if present, and while it contains at least 25% by weight of total solids calculated as mixed oxides, into contact with a cation-exchange material on the hydrogen cycle thereby to convert the cations of the dissolved material in said liquid reaction mass to H+ ions and to form a heteropolymolybdic acid; and (IV) recovering the thusly-formed heteropolymolybdic acid.

2. The method as in claim 1 wherein the water-soluble molybdate of (A) is an alkali-metal molybdate and the source of the heteroatom of (B) is at least one alkali-metal compound of a heteroatom.

3. The method as in claim 2 wherein the alkali-metal molybdate of (A) is sodium molybdate and the source of the heteroatom of (B) is at least one sodium compound of a heteroatom.

4. The method as in claim 3 wherein the source of the heteroatom of (B) is sodium silicate and the product that is recovered is silicomolybdic acid.

5. The method as in claim 3 wherein the source of the heteroatom of (B) is sodium vanadate and the product that is recovered is vanadomolybdic acid.

6. The method as in claim 3 wherein the source of the heteroatom of (B) is sodium phosphate and the product that is recovered is phosphomolybdic acid.

7. The method as in claim 1 wherein the water-soluble molybdate of (A) is sodium molybdate; the source of the heteroatom of (B) is a sodium salt of the heteroatom, and the amount thereof is sufficient to provide from 0.5 to about 2.0 gram atoms of the heteroatom for each 12 gram atoms of molybdenum in the sodium molybdate of (A); the temperature at which the aqueous liquid reaction mass is maintained, as set forth in step (II), is ambient temperature; and the liquid reaction mass from step (II), after first removing therefrom any insoluble material if present, and while it contains from 25% to about 40% by weight of total solids calculated as the mixed oxides, is passed through a column of a cation-exchange resin on the hydrogen cycle thereby to convert the sodium ions of the dissolved material in the said liquid reaction mass to H+ ions and to form a heteropolymolybdic acid in aqueous solution.

8. The method as in claim 7 wherein the sodium salt of the heteroatom is selected from the group consisting of sodium silicate, sodium vanadate and sodium phosphate.

9. The method as in claim 7 wherein the cation-exchange resin is a sulfonated copolymer of styrene and divinylbenzene wherein the latter constitutes from about 6 to about 10 mole percent of the copolymer.

10. The method as in claim 9 wherein the cation-exchange resin has a wet-mesh particle size of 16–50 mesh (U.S. Standard Sieve Series) and a void volume of from 30 to 50%.

11. The method as in claim 10 wherein the liquid reaction mass is passed through a column of the defined cation-exchange resin at a flow rate of from about 0.3 to about 0.7 gallon/cubic foot/minute.

12. The method as in claim 11 wherein the flow rate is about 0.5 gallon/cubic foot/minute.

13. The method as in claim 7 wherein the cation-exchange resin is a copolymer of styrene and dinvylbenzene wherein the latter constitutes about 8 mole percent of the copolymer; it has a wet-mesh particle size of 16–50 mesh and a void volume of about 40%; and the liquid reaction mass is passed through the said cation-exchange resin at a flow rate of about 0.5 gallon/cubic foot/minute.

14. The method as in claim 13 wherein the heteropolymolybdic acid that is formed in aqueous solution during passage of the liquid reaction mass through the column of cation-exchange resin is silicomolybdic acid; and the said acid is recovered from the effluent by crystallization therefrom.

15. The method as in claim 13 wherein the heteropolymolybdic acid that is formed in aqueous solution during passage of the liquid reaction mass through the column of cation-exchange resin is vanadomolybdic acid; and the said acid is recovered from the effluent by crystallization therefrom.

16. The method as in claim 13 wherein the heteropolymolybdic acid that is formed in aqueous solution during passage of the liquid reaction mass through the column of cation-exchange resin is phosphomolybdic acid, and the said acid is recovered from the effluent by crystallization therefrom.

References Cited

UNITED STATES PATENTS

| | | | |
|---|---|---|---|
| 2,503,991 | 4/1950 | Bechtold | 23—140 |
| 3,288,562 | 11/1966 | Laferty | 23—140 |
| 3,361,518 | 1/1968 | Chiola et al. | 23—23 |

HERBERT T. CARTER, *Primary Examiner.*

U.S. Cl. X.R.

23—140